United States Patent [19]

Ogasawara

[11] 4,423,806
[45] Jan. 3, 1984

[54] PALLET CHANGING DEVICE FOR A NUMERICALLY CONTROLLED MACHINE TOOL

[75] Inventor: Susumu Ogasawara, Yokohama, Japan

[73] Assignee: Makino Milling Machine Co., Ltd., Tokyo, Japan

[21] Appl. No.: 297,110

[22] Filed: Aug. 28, 1981

[30] Foreign Application Priority Data

Sep. 5, 1980 [JP] Japan ............................ 55-125532[U]

[51] Int. Cl.³ ............................................. B65G 37/00
[52] U.S. Cl. ................................... 198/339; 198/472
[58] Field of Search ..................... 198/339, 345, 472; 414/744, 750, 682; 269/69, 73

[56] References Cited

U.S. PATENT DOCUMENTS 2,711,817  6/1955  Hautau et al. ..................... 198/339
4,014,428  3/1977  Ossbahr ............................. 198/472
4,148,400  4/1979  Cross ................................. 198/345
4,172,512  10/1979  Clegg et al. ...................... 198/472

Primary Examiner—Joseph E. Valenza
Assistant Examiner—Jonathan D. Holmes
Attorney, Agent, or Firm—McAulay, Fields, Fisher, Goldstein & Nissen

[57] ABSTRACT

A device for performing the change of a pallet between a pallet support and a machine tool. The device has a pallet holding structure for holding a pallet while the change of a pallet is carried out, and a pallet transferring structure for transferring the pallet holding structure when that structure is holding a pallet to be changed between the pallet support and the machine tool. The pallet transferring structure is mounted on one of the two lateral movement elements of the machine tool so that the pallet transferring structure is operated in association with the movements of the two lateral movement elements of the machine tool.

18 Claims, 6 Drawing Figures

PALLET CHANGING DEVICE FOR A NUMERICALLY CONTROLLED MACHINE TOOL

DESCRIPTION OF THE INVENTION

The present invention relates to a pallet changing device of a numerically controlled machine tool.

A pallet changing device of a numerically controlled machine tool is conventionally used for bringing an unmachined workpiece to a machining station of the numerically controlled machine tool and for taking a machined workpiece out of the machining station. One typical pallet changing mechanism of a machine tool is disclosed in U.S. Pat. No. 4,172,512 granted to Clegg et al. In the disclosed mechanism, a work table of the machine tool and a pallet shuttle of the pallet changing mechanism are driven by a common drive. The pallet shuttle is moved so as to reciprocately slide a pallet between a machining station and a separate workpiece replacing station of the machine tool. However, the separate arrangement of the above-mentioned two stations brings about such an inconvenience that a large ground floor area is required for the installation of a numerically controlled machine tool.

An object of the present invention is therefore to provide a numerically controlled machine tool with a pallet changing device, in which the movement of machine elements in the machining station can be directly employed for the pallet changing operation, thereby enabling the numerically controlled machine tool to be installed in a relatively small ground floor area.

SUMMARY OF THE INVENTION

The pallet changing device of a numerically controlled machine tool, according to the present invention is specifically described in the attached claims and has a specific pallet transferring means mounted on a slide of the machine tool. The pallet transferring means, which transfers a pallet between a machine tool proper and a pallet support, is operated due to the utilization of the two drive motors used as feed motors for the two perpendicular lateral movements of the machine tool, the two lateral positioning devices of the machine tool and a numerical controller for controlling the feed motors and the positioning devices. Thus, the pallet changing device according to the present invention does not require any specific actuators and controllers to perform the pallet changing operation. Further in the present invention, a pallet support which may be arranged so as to be separate from the machine tool proper or may be formed as an integral projecting part from the machine tool proper has only a function to support thereon a pallet or pallets. Thus, the pallet changing device can be of simple construction and reduce the area necessary for installing the pallet changing device per se.

BRIEF DESCRIPTION OF THE DRAWINGS

The present invention will now be apparent from the ensuing description of embodiments with reference to the accompanying drawings wherein.

DESCRIPTION OF THE PREFERRED EMBODIMENT

Figure 1:
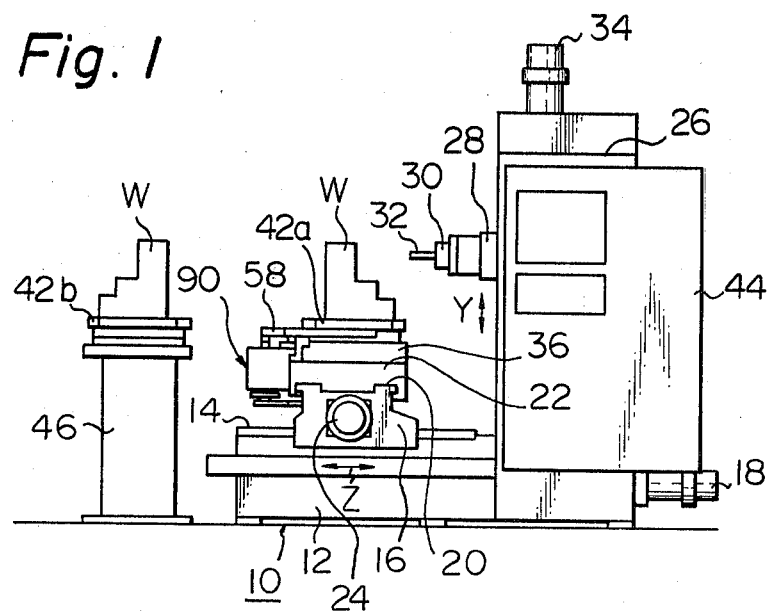
FIG. 1 is a front elevation of a pallet changing device of a numerically controlled machine tool, in accordance with the present invention.
Figure 2:
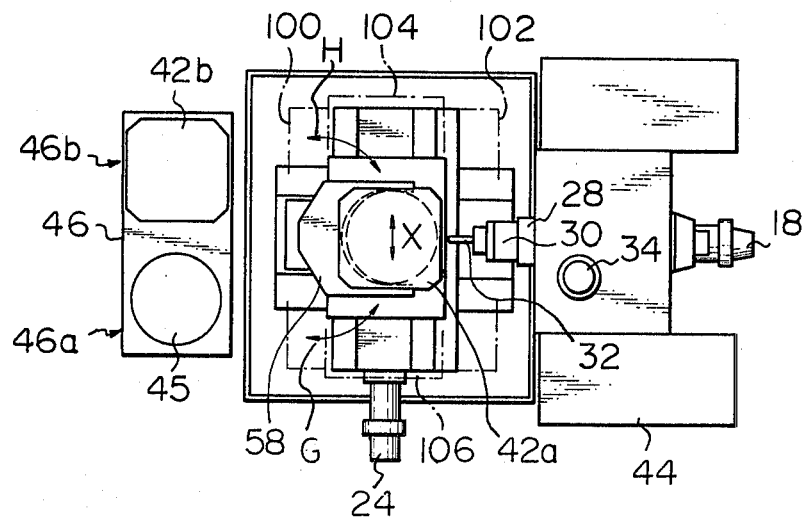
FIG. 2 is a plan view of the pallet changing device of FIG. 1.
Figure 3:
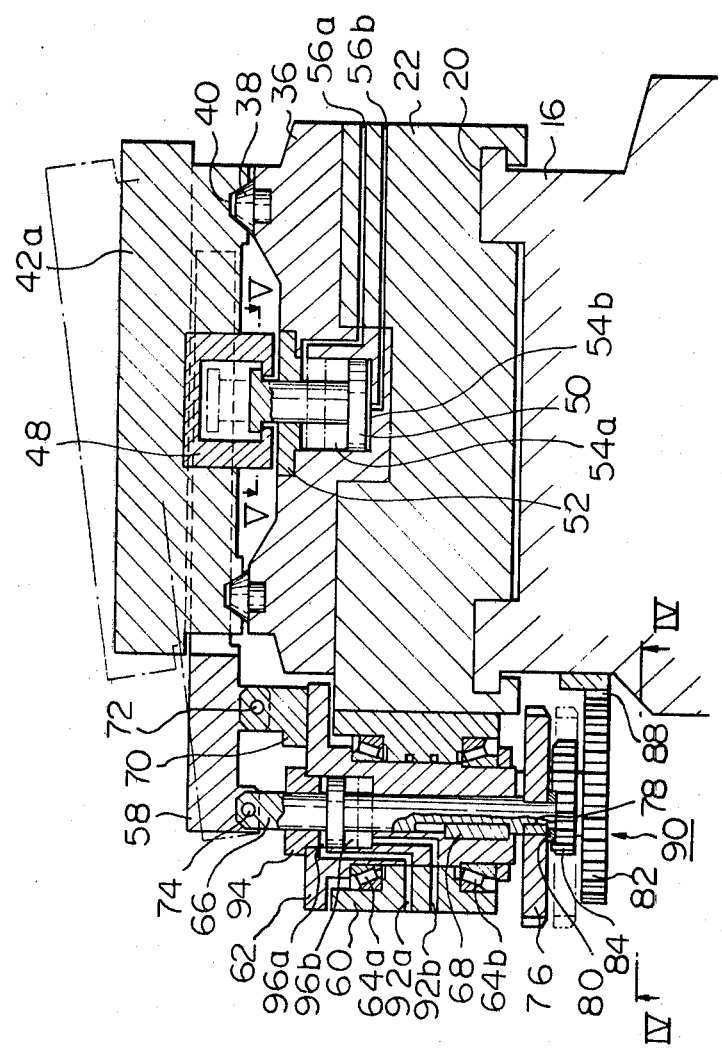
FIG. 3 is an enlarged sectional view of an essential part of the device of FIG. 1, for illustrating the structure of the pallet changing device of FIGS. 1 and 2.
Figure 4:
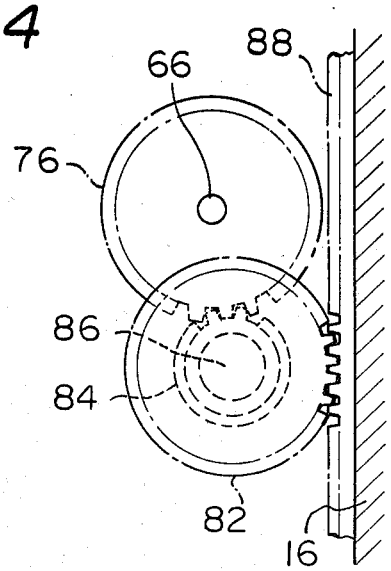
FIG. 4 is a partial end view along the line IV—IV of FIG. 3.

FIGS. 1 to 5 inclusive illustrates a pallet changing device of a numerically controlled machine tool, according to an embodiment of the present invention. Referring specifically to FIGS. 1 and 2, a first slide 16 is slidable along a z-axis guide surface 14 formed on the bed 12 of a machine tool proper 10 by being driven by a z-axis drive motor 18 in directions shown by a double-headed arrow Z. A second slide 22 is slidable along an X-axis guide surface 20 formed on the first slide 16 by being driven by an X-axis drive motor 24 in directions shown by a double-headed arrow X. (FIG. 2). The lower slide and the upper slide as designated in the appended claims correspond to the first slide 16 and the second slide 22 respectively. A spindle head 28 is slidable along a Y-axis sliding surface, not shown, formed vertically on the column 26 incorporated into the bed 12 by being driven by a Y-axis drive motor 34. A pallet positioning table 36 is mounted on the second slide 22 so as to be capable of being indexed about an axis parallel to the Y-axis. Four tapered positioning pins 38 are attached to the pallet positioning table 36, although only two of them are illustrated in FIG. 3. A pallet 42a or 42b having tapered recesses 40 for closely receiving the positioning pins 38 is clamped on the pallet positioning table 36. Workpieces W are mounted on the pallets 42a and 42b. A tool 32 is attached to the spindle 30 rotatably supported by the spindle head 28. Relative motion between the workpiece W mounted on the pallet 42a (FIGS. 1 and 2) and the tool 32 controlled by a numerical controller 44 controlling the operation of the X-, Y- and Z-axis drive motors 24, 34 and 18 respectively, and allows the workpiece W to be machined into a required shape of product. On a pallet support 46 disposed separately from the machine tool proper 10, a pallet 42b carrying an unmachined workpiece W is placed and at least one pallet seating surface 45 is formed.

Figure 5:
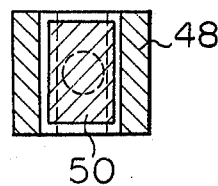
FIG. 5 is a partial sectional view taken along the line V—V of FIG. 3.

Referring to FIG. 3, a clamping member 48 fixed to the bottom surface of the pallet 42a is brought into a clamping position or an unclamping position relative to the pallet positioning table 36 by means of a clamping piston 50 disposed on the pallet positioning table 36. The clamping of the clamping member 48 is attained by introducing a pressurized fluid, a pressurized oil, for instance, into an upper chamber 54a formed between a cap 52 and the clamping piston 50 through a working oil supply port 56a so that the clamping piston is moved downward to restrain the clamping member 48, whereas the unclamping of the clamping member 48 is attained by introducing the pressurized oil into a lower chamber 54b through an working oil supply port 56b so that the clamping piston 50 is moved upward to release the clamping member 48. FIG. 5 is a sectional view of FIG. 3 taken along the line V—V. A fork-shaped pallet holding device 58 is inserted between the pallet 42a and the pallet positioning table 36. A block 60 is attached to the side face of the second slide 22 under the rear end side of the pallet holding device 58. A swivel cylinder 62 is rotatably mounted on the block 60 at the central part thereof by means of bearings 64a and 64b. A lifting piston 66 of a round rod-shape is fitted through the central part of the swivel cylinder 62 and connected with the swivel cylinder by a key 68 so as to be slidable in the axial direction and rotatable together with the swivel cylinder 62. A support 70 is attached to the upper surface of the swivel cylinder 62. The support 70 and the pallet holding device 58 are pivotally connected by a supporting pin 72 so as to be able to turn about the supporting pin 72. The upper end of the lifting piston 66 is joined to the rear end of the pallet holding device 58 by a pin 74. A gear wheel 76 is keyed to the lower end of the lifting piston 66 by a key 78 and secured by a nut 80 to prevent falling off. A shaft 86 provided with gear wheels 82 and 84 fixed thereto (FIG. 4) is rotatably supported on the block 60. The gear wheel 82, in particular, is always in engagement with a rack 88 attached to the side surface of the first slide 16 and extending in the X-axis direction (FIG. 2). With the lifting piston 66 at its lower (indicated by dashed lines) position, the gear wheel 76 is also positioned at a position shown by broken lines in FIG. 3 where the gear wheel 76 engages with the gear wheel 84. Thus the gear wheels 82, 84 and 76, lifting piston 66 and the swivel cylinder 62 constitute a pallet transferring device 90, the operation of which will be later described. When a pressurized fluid, hydraulic oil, for instance, is introduced into an upper chamber 96a between a cap 94 and the lifting piston 66 through a pressurized oil supplying port 92a formed in the block 60 and the swivel cylinder 62 with the clamping piston 50 in an unclamping position, the lifting piston 66 is lowered, so that the pallet holding device 59 is turned about the supporting pin 72 to raise the pallet 42a and to disengage the positioning pins 38 from the recesses 40 of the pallet 42a. Simultaneously with the turning of the pallet holding device 58, the gear wheel 76 is lowered to become engaged with the gear wheel 84. Alternatively, when the pressurized oil is introduced into a lower chamber 96b through a pressurized oil supplying port 92b formed in the swivel cylinder 62 and the block 60, the lifting piston 66 is raised so that the pallet 42a is seated on the pallet positioning table 36 and simultaneously, the gear wheel 84 and the gear wheel 76 are disengaged. Regarding the pallet changing device of a numerically controlled machine tool having the construction as hereinbefore described, the manner of operation of changing the pallet 42a mounted with a machined workpiece W seated on the pallet positioning table 36 for the other pallet 42b mounted with an unmachined workpiece W and placed on the pallet support 46 at the position 46b will be described hereinafter in order. When the machining of the workpiece W mounted on the pallet 42a is completed, first the numerical controller 44 (FIGS. 1 and 2) controls the first slide 16 and the second slide 22 to move to the Z-axis forward position 100 and to the X-axis pallet changing position 104, respectively as shown by alternate long and short dash lines; then the clamping piston 50 is raised so that the pallet 42a becomes unclamped and released from the pallet positioning table 36; then the lifting piston 66 is lowered to lift up the pallet 42a from the pallet positioning table 36 so that the positioning pins 38 and the recesses 40 of the pallet 42a are disengaged and, simultanesouly, the gear wheel 84 engages with the gear wheel 76; then the second slide 22 is controlled to move to the X-axis pallet changing position 106. During the movement of the second slide 22, the rotation of the gear wheel 82 caused by the engagement of the gear wheel 82 with the rack 88 is transmitted through the gear wheel 84, gear wheel 76 and the lifting piston 66 to the swivel cylinder 62, finally causing the pallet holding device 58 to turn about the lifting piston 66 in a direction as shown by an arrow G. This turning motion of the pallet holding device 58 disengages the clamping member 48 from the clamping piston 50. The pallet changing device is adapted so that the pallet 42a is stopped directly above the position 46a on the pallet support 46 when the second slide 22 is positioned at the X-axis pallet changing position 106. With the pallet 42a thus positioned directly above the position 46a on the pallet support 46, the lifting piston 66 is raised to lower the pallet 42a to place the pallet 42a on the pallet support 46 at the position 46a. Then, the first slide 16 is retracted to the Z-axis rearward position 102 (FIG. 2) with the lifting piston kept raised, namely, with the pallet holding device 58 in horizontal situation, to withdraw the fork-shaped pallet holding device 58 from between the pallet 42a and the pallet support 46; then the second slide 22 is controlled to move to the X-axis pallet changing position 104 (FIG. 2). During this movement of the second slide 22 to the X-axis pallet changing position 104, the pallet holding device 58 is not turned since the gear wheels 84 and 76 are disengaged. Then, the first slide 16 is moved to the Z-axis forward position 100 again, and the pallet holding device 58 is inserted between the pallet 42b and the pallet support 46. Then, the lifting piston 66 is lowered to make the pallet holding device 58 lift up the pallet 42b and, simultaneously, the gear wheels 84 and 76 are engaged with one another; thereafter, the second slide 22 is moved to the X-axis pallet changing position 106. During the movement of the second slide 22 to the X-axis pallet changing position 106, the pallet holding device 58 is turned due to the engagement of the gear wheel 84 with the rack 88 in a direction as shown by an arrow H to position the pallet 42b directly above the pallet positioning table 36. Upon completion of the positioning of the pallet 42b directly above the pallet positioning table 36, the gears 84 and 76 are disengaged. Then, the clamping piston 50 is lowered so as to fix the pallet 42b to the pallet positioning table 36. After the pallet 42b mounted with an unmachined workpiece W has been fixed, the machining operation is started. The pallet holding device 58 remains inserted between the pallet 42b and the pallet positioning table 36 during the machining operation, however, the pallet holding device 58 will not turn if the second slide 22 moves since the gear wheels 84 and 76 are disengaged. After the machining has been completed, the first slide 16 is moved to the Z-axis forward position 100 for the next pallet changing operation. In the next pallet changing operation, the position 46b on the pallet support 46 is not occupied by the preparatory pallet, therefore, the second slide 22 is first moved to the X-axis pallet changing position 106, then the lifting piston 66 is lowered and the second slide 22 is moved to the X-axis pallet changing position 104 where the pallet 42b mounted with a machined workpiece W is turned in the direction shown by an arrow H, thus finally transferring the pallet 42b to the position 46b on the pallet support 46.

On the other hand, the machined workpiece W mounted on the pallet 42a, which was transferred previously to the pallet support 46, has been replaced with the next workpiece W to be machined during the machining operation for the preceeding workpiece W. The pallet 42b is then changed for the pallet 42a in the same procedure as hereinbefore described.

The pallet support 46 of this embodiment has two positions 46a and 46b for receiving the pallets, however, a pallet magazine capable of accommodating a further number of pallets may replace the pallet support 46 of this embodiment for the same purpose.

Naturally, the combined pallet changing operation of the first slide 16, second slide 22, pallet positioning table 36, pallet holding device 58 and the pallet transferring device 90 of the machine tool proper 10 can be automatically and numerically controlled along with the machining procedure by previously programming the numerical controller 44 to carry on the pallet changing procedure. Thus, the pallet changing device of the present invention effectively saves labor in the automatic machining process.

Figure 6:
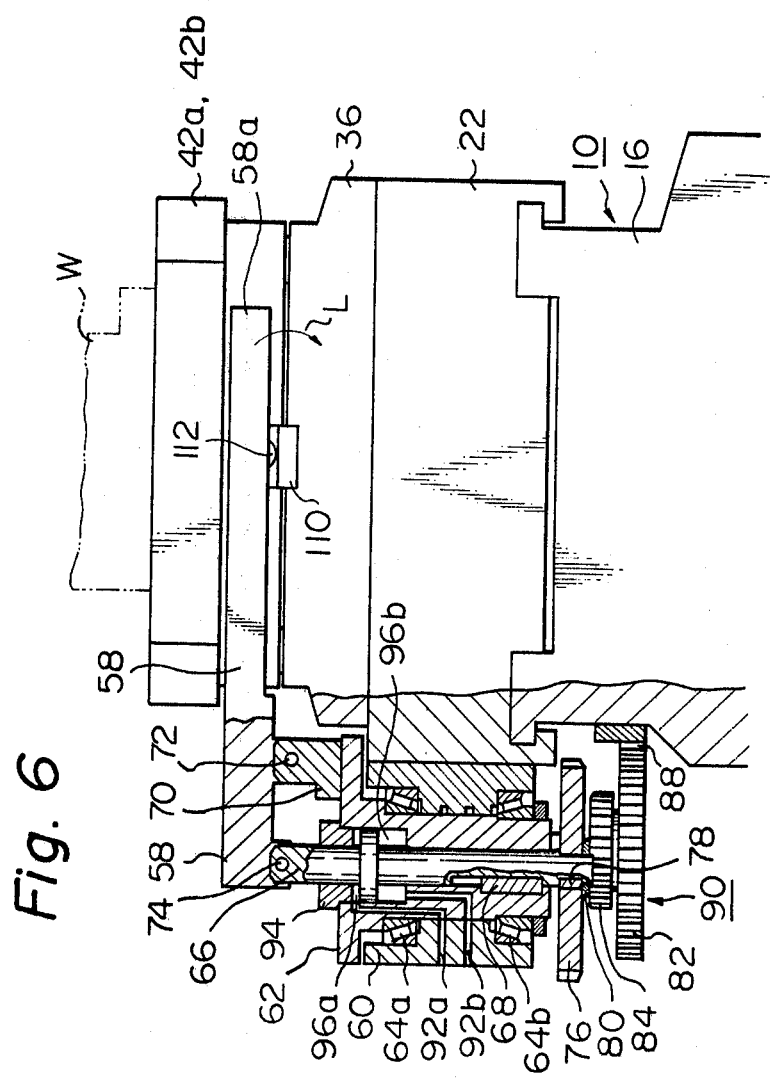
FIG. 6 is a partial front elevation of an essential part of a pallet changing device, in accordance with another embodiment of the present invention.

FIG. 6 illustrates another embodiment of a pallet changing device of a numerically controlled machine tool, according to the present invention, wherein a part of the mechanism of the embodiment of the embodiment of FIGS. 1 to 5 is further simplified. In FIG. 6, the same parts or elements as those of the embodiment hereinbefore described are designated by the same reference numerals as those used in FIGS. 1 to 5.

The significant characteristics of the embodiment of FIG. 6 are the simplified mechanisms of the machine tool proper 10, relative to those corresponding mechanism of the embodiment of FIGS. 1 to 5, for positioning and restraining to clamp the pallet 42a or 42b on the pallet positioning table 36 and for releasing or unclamping the pallet 42a or 42b from the pallet positioning table 36. Therefore, both embodiments are the same in respect to the constitution and function of performing the pallet changing operation between the machine tool proper 10 and the separate pallet support 46 by means of the pallet holding device 58 and the pallet transferring device 90. Accordingly, a description will be provided hereinafter regarding only the above-mentioned characteristics.

Brackets 110 integral with or attached by suitable means to the pallet 42a or 42b are provided for the pallet on the respective side surface while protrusions 112 are formed on the respective forked-arms 58a of the pallet holding device 58. The pallet 42a or 42b is depressed and held clamped on the pallet positioning table 36 by the pallet holding device 58 through the engagement of the protrusions 112 with the brackets 110 by utilizing the fact that the pallet holding device 58 is always inserted between the pallet 42a or 42b and the pallet positioning table 36 throughout the period of machining the workpiece W on the machine tool proper 10. The lifting piston 66 is maintained at the raised position with the pressurized fluid continuously supplied to the lower chamber 96b of the swivel cylinder 62 through the pressurized oil supplying port 92b during the machining operation, so that the pallet holding device 58 is continuously urged in a direction shown by an arrow L. Consequently, the protrusions 112 depress the respective brackets 110 so that the pallet is kept clamped on the pallet positioning table 36. In order to unclamp the pallet, the pressurized fluid is introduced into the upper chamber 96a of the swivel cylinder 62 through the pressurized fluid supplying port 92a as a matter of course. Thus this embodiment, as hereinbefore described, is capable of eliminating the clamping mechanism of the previous embodiment including the clamping member 48, the clamping piston 50 and pressurized fluid supplying ports 56a and 56b and simplifying the mechanism of the pallet changing device through attaining the clamping and unclamping of the pallet on the pallet positioning table 36 by the provision of the brackets 110 and the protrusions 112 and the use of the upward and downward movement of the lifting piston 66.

From the foregoing description of the two embodiments according to the present invention, it will be understood that the present invention is capable of simplifying the construction of the pallet changing device and reducing the area necessary for the installation of the device by dispensing with the actuator and controller exclusively provided for the pallet changing device of the conventional type and requiring only the pallet support as a separate component of the pallet changing device of the present invention, since in the pallet changing device of the present invention, the pallet transferring device 90 is mounted on the second slide 22, which is one of the components of the machine tool proper 10, and the X- and Z-axis driving motors 24 and 18, X-axis and Z-axis positioning mechanisms and the controller 44 for controlling the operation of those components, which are essential components or elements of the numerically controlled machine tool, are used for performing the pallet changing operation.

I claim:

1. A pallet changing device for cooperation with an associated numerically controlled machine tool having a machine bed, a lower slide mounted on said machine bed so as to be slidable along a first lateral axis, an upper slide mounted on said lower slide so as to be slidable along a second lateral axis perpendicular to said first lateral axis, the device moving a pallet between successive positions and comprising:

a pallet dimensioned and configured for holding a workpiece thereon;

a pallet support for resting a pallet;

a pallet positioning table mounted on said upper slide and adapted for positioning said pallet thereon;

a clamping means for clamping said pallet to said pallet positioning table;

a pallet holding means for holding a pallet while the movement of a pallet is carried out;

a pallet transferring means mounted on said associated upper slide and adapted for moving said pallet holding means between said pallet positioning table and said pallet support being selectively responsive to sliding movement of said associated upper slide along said second lateral axis during movement of a pallet between said pallet positioning table and said pallet support;

said pallet transferring means including a first gear wheel rotatably attached to said upper slide and engaged with a rack which is attached to said lower slide and extends parallel with said second lateral axis;

a lifting means cooperating with said pallet holding means for removing said pallet held by said pallet holding means from said pallet positioning table or said pallet support and for seating said pallet held by said holding means on said pallet positioning table or said pallet support; and a mechanical transmitting means for establishing a mechanical interconnection between said first gear wheel and said pallet holding means which is responsive to the removal of said pallet from said pallet positioning table or said pallet support, said mechanical transmitting means transmitting a rotating motion of said gear wheel caused by the engagement of said first gear wheel with said rack to said pallet holding means, said mechanical transmitting means disconnecting said pallet holding means from said first gear wheel responsive to the seating of said pallet on said pallet positioning table or said pallet support to interrupt the transmission of rotating motion of said first gear wheel to said pallet holding means.

2. A pallet changing device as claimed in claim 1, wherein:
said clamping means comprises a clamping member fixed to a pallet, and a fluidly operated clamping piston mounted in said pallet positioning table which is engageable with said clamping member for clamping said pallet to said pallet positioning table.

3. A pallet changing device as claimed in claim 2, wherein:
said clamping means comprises means for pressing said pallet held by said pallet holding means against said pallet positioning table in response to the movement of said lifting means.

4. A pallet changing device as claimed in claim 3, wherein:
said means for pressing comprises a pair of bracket member attached to said pallet, and a pair of corresponding protrusions provided for said pallet holding means, said protrusions being capable of pressing said bracket means toward said pallet positioning table in response to said movement of said lifting means.

5. A pallet changing device as claimed in claim 1, wherein:
said pallet holding means comprises a fork-shaped member mounted for movement about a horizontal axis relative to said pallet positioning table, said fork-shaped member having a fork-shaped arm for holding said pallet thereon and a rear end; and
wherein said lifting means comprises a fluidly operated lifting piston non-rotatably and axially slidably disposed in a swivel cylinder, said lifting piston having an upper end pivotally connected to said rear end of said fork-shaped member.

6. A pallet changing device as claimed in claim 5, wherein:
said mechanical transmitting means comprises a second gear wheel attached to the lower end of said lifting piston, and a third gear wheel disengageably engageable with said second gear wheel, said third gear wheel being rotatably attached to said upper slide so as to be coaxial with said first gear wheel engaged with said rack.

7. A pallet changing device for cooperation with an associated numerically controlled machine tool having a machine bed, a lower slide mounted on said machine bed so as to be slidable along a first lateral axis, an upper slide mounted on said lower slide so as to be slidable along a second lateral axis perpendicular to said first lateral axis, the device moving a pallet between successive positions and comprising:
a pallet dimensioned and configured for holding a workpiece thereon;
a pallet support for resting a pallet;
a pallet positioning table mounted on said upper slide and adapted for positioning said pallet thereon;
a clamping means for clamping said pallet to said pallet positioning table;
a pallet holding means for holding a pallet while the movement of a pallet is carried out; and
a pallet transferring means mounted on said associated upper slide and adapted for moving said pallet holding means between said pallet positioning table and said pallet support being selectively responsive to sliding movement of said associated upper slide along said second lateral axis during movement of a pallet between said pallet positioning table and said pallet support.

8. A pallet changing device as claimed in claim 7, wherein said pallet transferring means comprises:
a rack attached to the associated lower slide and which extends parallel with said second lateral axis; and
a first gear wheel rotatably attached to said upper slide and engaged with said rack which is attached to said lower slide.

9. A pallet changing device as claimed in claim 8, further including:
a lifting means cooperating with said pallet holding means for removing said pallet held by said pallet holding means from said pallet positioning table or said pallet support and for seating said pallet held by said holding means on said pallet position table or said pallet support.

10. A pallet changing device as claimed in claim 9, further including:
a mechanical transmitting means for establishing a mechanical interconnection between said first gear wheel and said pallet holding means in association with the removing of said pallet from said pallet positioning table or said pallet support thereby transmitting a rotating motion of said gear wheel caused by the engagement of said first gear wheel with said rack to said pallet holding means.

11. A pallet changing device as claimed in claim 10, wherein:
said mechanical transmitting means is capable of disconnecting said pallet holding means from said first gear wheel.

12. A pallet changing device as claimed in claim 11, wherein:
said clamping means comprises a clamping member fixed to a pallet, and a fluidly operated clamping piston mounted in said pallet positioning table which is engageable with said clamping member for clamping said pallet to said pallet positioning table.

13. A numerically controlled machine tool including a pallet changing device comprising a numerically controlled machine tool having a machine bed, a lower slide mounted on said machine bed so as to be slidable along a first lateral axis, an upper slide mounted on said lower slide so as to be slidable along a second lateral axis perpendicular to said first lateral axis, the device moving a pallet between successive positions and comprising:
a pallet dimensioned and configured for holding a workpiece thereon;
a pallet support for resting a pallet;
a pallet positioning table mounted on said upper slide and adapted for positioning said pallet thereon;

a clamping means for clamping said pallet to said pallet positioning table;

a pallet holding means for holding a pallet while the movement of a pallet is carried out; and a pallet transferring means mounted on said associated upper slide and adapted for moving said pallet holding means between said pallet positioning table and said pallet support being selectively responsive to sliding movement of said associated upper slide along said second lateral axis during movement of a pallet between said pallet positioning table and said pallet support.

14. The machine tool as described in claim 13, wherein:

said numerically controlled machine tool has a horizontal spindle.

15. A pallet changing device for cooperation with an associated numerically controlled machine tool having a machine bed, a lower slide mounted on said machine bed so as to be slidable along a first lateral axis, an upper slide mounted on said lower slide so as to be slidable along a second lateral axis perpendicular to said first lateral axis, the device moving a pallet between successive positions and comprising:

a pallet dimensioned and configured for holding a workpiece thereon;

a pallet support for resting a pallet;

a pallet positioning table mounted on said upper slide and adapted for positioning said pallet thereon;

a pallet holding means for clamping said pallet to said pallet positioning table and for holding a pallet while the movement of a pallet is carried out; and a pallet transferring means mounted on said associated upper slide and adapted for moving said pallet holding means between said pallet positioning table and said pallet support being selectively responsive to sliding movement of said associated upper slide along said second lateral axis during movement of a pallet between said pallet positioning table and said pallet support.

16. A pallet changing device as claimed in claim 15, wherein:

said pallet holding means comprises a fork-shaped member turnable about a horizontal axis relative to said pallet positioning table.

17. A pallet changing device as claimed in claim 16, wherein:

said fork-shaped member has a fork-shaped arm holding thereon said pallet and a rear end, and wherein said lifting means comprises a fluidly operated lifting piston non-rotatably axially slidably fitted in a swivel cylinder, said lifting piston having an upper end pivotally connected to said rear end of said fork-shaped member.

18. A pallet changing device as claimed in claim 17, wherein:

said mechanical transmitting means comprises a second gear wheel attached to the lower end of said lifting piston, and a third gear wheel disengageably engageable with said second gear wheel, said third gear wheel being rotatably attached to said upper slide so as to be coaxial with said first gear wheel engaged with said rack.

* * * * *